No. 775,814.

Patented November 22, 1904.

UNITED STATES PATENT OFFICE.

CURT GENTSCH, OF VOHWINKEL, NEAR ELBERFELD, GERMANY, ASSIGNOR TO FARBENFABRIKEN OF ELBERFELD CO., OF NEW YORK, N. Y., A CORPORATION OF NEW YORK.

PHENOL COMPOUND.

SPECIFICATION forming part of Letters Patent No. 775,814, dated November 22, 1904.

Application filed June 6, 1904. Serial No. 211,386. (No specimens.)

*To all whom it may concern:*

Be it known that I, CURT GENTSCH, doctor of philosophy, chemist, (assignor to the FARBENFABRIKEN OF ELBERFELD COMPANY, of New York,) residing at Vohwinkel, near Elberfeld, Germany, have invented a new and useful Improvement in New Phenol Compounds; and I hereby declare the following to be a clear and exact description of my invention.

My invention relates to the preparation of hitherto-unknown crystallized additional compounds consisting of phenols and alkaline salts of phenol.

The term "phenol" is here used in a broad sense to comprise not only phenol, (carbolic acid,) but also the cresols, xylenols, mixtures thereof, or the like.

The process for producing these bodies consists in treating phenols—such as phenol, (carbolic acid,) cresols, xylenols, or the like, mixtures of phenols, such as crude cresol, &c.—with alkaline carbonates, caustic alkalies, or alkaline salts of phenols with or without the addition of suitable solvents.

The new compounds thus obtained are crystals of alkaline reaction, the phenol employed being split off therefrom by heating these bodies over the melting-point. They are of great value as therapeutic, especially disinfecting, agents.

In order to carry out my process practically, I can, for instance, proceed as follows, the parts being by weight: 22.4 parts of potassium hydroxid (KOH) are mixed with a solution of 86.4 parts of metacresol in sixty parts of benzene, and the resulting mixture is heated until a solution results. From this solution on cooling the new additional compound having the formula

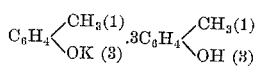

is separated, which is then isolated by filtration. It represents whitish needles of alkaline reaction having the melting-point of 88° centigrade and splitting off metacresol on being heated over the melting-point. The corresponding additional compound obtained from orthocresol melts at 110° centigrade, that obtained from paracresol at 146° to 147° centigrade. The analogous product derived from phenol (carbolic acid) forms needles melting at from 106° to 108° centigrade. All these bodies containing potassium consist of one molecule of the potassium salt of the phenol and of three molecules of the free phenol, which has been used.

The analogous additional compounds obtained from carbolic acid or paracresol containing sodium have the following formulæ:

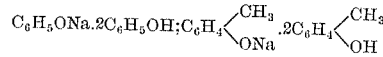

The process proceeds in an analogous manner on employing other phenols, caustic-soda lye, or alkaline carbonates.

On using, *e. g.*, phenol and potassium carbonate according to the following equation

a mixture of the phenol double compound with potassium bicarbonate results, from which mixture the former is isolated by extraction with alcohol, &c.

The new products can also be obtained by introducing, *e. g.*, solid phenolates of alkalies into a hot solution of a phenol in an organic liquid. From the cooled mixture the resulting additional compounds are then isolated, as above described.

Having now described my invention and in what manner the same is to be performed, what I claim as new, and desire to secure by Letters Patent, is—

1. The herein-described new additional compounds consisting of one molecule of an alkaline salt of a phenol and of several molecules of a free phenol, which products are crystalline bodies possessing an alkaline reaction, the phenol contained therein being split off by heating these bodies over the melting-point, substantially as hereinbefore described.

2. The herein-described new additional compound consisting of one molecule of the potassium salt of metacresol and three molecules of metacresol having the formula:

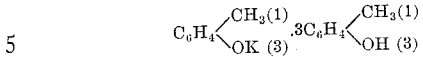

which body represents whitish needles possessing an alkaline reaction and melting at 88° centigrade, free metacresol being split off by heating the new body over 88° centigrade, substantially as hereinbefore described.

In testimony whereof I have signed my name in the presence of two subscribing witnesses.

CURT GENTSCH.

Witnesses:
 OTTO KÖNIG,
 HEINR. SHLEFELDER.